3,337,062
STORAGE RACKS
Edward A. Seiz, 136 E. 3rd St.,
Lansdale, Pa. 19446
Filed Oct. 23, 1965, Ser. No. 503,774
9 Claims. (Cl. 211—176)

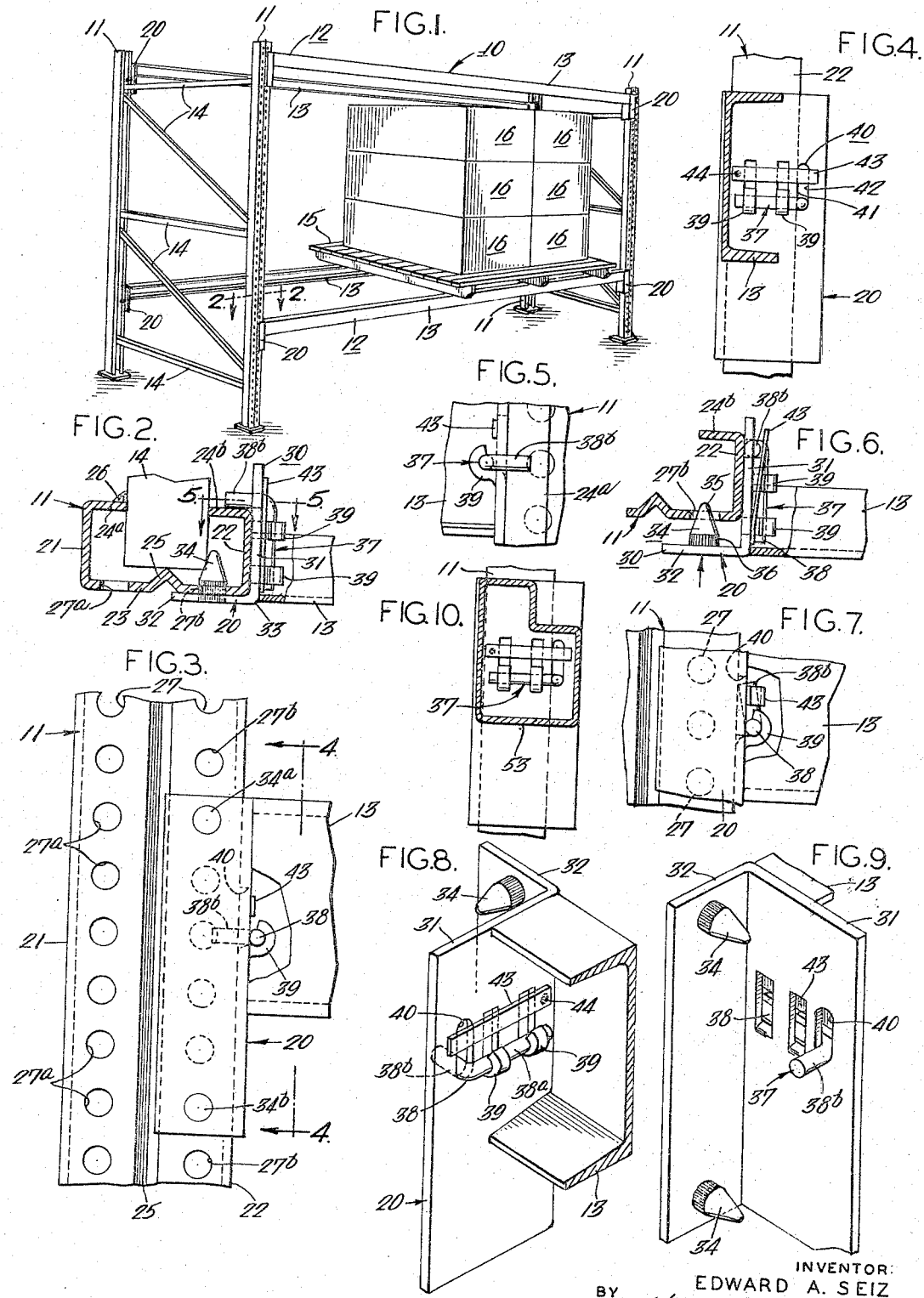

ABSTRACT OF THE DISCLOSURE

A storage rack comprising uprights and load support beams disposed intermediate the uprights, wherein the beams are coupled to the uprights by an angular coupling element having pin means adapted to engage in apertures in the upright by displacement of the beam axially of the pin means, and a latch operable to engage behind the uprights to prevent outward displacement of the beam, the latch being prevented from inadvertent displacement by suitable biasing means.

---

The present invention relates to storage racks and more particularly to improvements in storage racks of the type in which shelving may be placed at any level to accommodate differences in the size of goods being loaded in the shelves.

Storage racks having means to facilitate the accommodation of differences in the size of goods being loaded therein are designed for receiving loaded pallets which are oftentimes handled by fork-lift trucks or the like. While loading the pallets onto the shelves, it frequently occurs that the fork-lift engages or snags the shelves of the rack, and if the shelves are of the easily displaceable variety, such engagement or snagging will dislodge them. Obviously, the remounting of the shelves is necessitated in order to finish the loading operation, which remounting results in a waste of time and therefore money.

In my copending application, Ser. No. 404,219, filed on Oct. 16, 1964, now U.S. Patent No. 3,273,720, a storage rack is provided having easily displaceable but rigidly securable load support members upon which loaded pallets may be positioned. The securing the load support members is accomplished by quick disconnect couplings which require no auxiliary tools in order to move the support members from one position to another. In this manner variations in bulk package size is accommodated.

However, the quick disconnect coupling described and defined in the above-identified copending application is particularly useful with modified upright or post construction and in heavier storage racks particularly adapted to carry great loads.

Although a storage rack having quick disconnect couplings as heretofore described is economically competitive with the bolted load support member storage racks, their price may be somewhat higher due to the special upright construction required and the increased load bearing capabilities. In many instances however it is unnecessary to provide such a rigid and extremely strong structure as the loads to be carried by the storage racks are not of the magnitude requiring such a structure.

In view of the above, it is a principal object of the present invention to provide a novel storage rack which may be composed of either a light or heavy frame structure and which may be comprised of standard U-shaped or open box-shaped or the like beams.

Another object of the present invention is to provide a storage rack of the afore-mentioned type having easily displaceable but rigidly securable load support members upon which, for example, loaded pallets may rest.

Still another object of the present invention is to provide an economical quick disconnect coupling which may be positioned at one or the other or both ends of the load support members, which couplings require no auxiliary tools in order to reposition the members when accommodating varying package sizes.

A further object of the present invention is to provide load support members which may be locked into a loading position by a novel locking means, which locking means prevents inadvertent vertical or lateral displacement.

Other objects and a fuller understanding of the invention may be had by referring to the following description and claims taken in conjunction with the accompanying drawings which:

FIG. 1 is a perspective view of storage rack apparatus constructed in accordance with the present invention;

FIG. 2 is an enlarged fragmentary sectional view taken along line 2—2 of FIG. 1;

FIG. 3 is a front view of that portion of the apparatus illustrated in FIG. 2;

FIG. 4 is a fragmentary sectional view taken along line 4—4 of FIG. 3;

FIG. 5 is a fragmentary sectional view taken along line 5—5 of FIG. 2;

FIG. 6 is a fragmentary sectional view similar to FIG. 2 except illustrating the manner in which a load support beam is connected to the storage rack apparatus;

FIG. 7 is a front view of the portion of the apparatus illustrated in FIG. 6;

FIGS. 8 and 9 are fragmentary perspective views illustrating apparatus complementary to the apparatus illustrated in FIGS. 2–7, and for use on the storage rack apparatus illustrated in FIG. 1; and FIG. 10 is a fragmentary sectional view of another embodiment of apparatus constructed in accordance with the present invention.

Referring now to the drawings, FIG. 1 illustrates a portion of a storage rack 10 having a plurality of uprights or posts 11 and storage shelves 12, which shelves comprise at least one load support beam 13 connected at either end to at least two of the uprights 11 by quick break coupling means 20. In the present instance four identical support beams 13 are illustrated, each having similar quick break coupling means 20 at their opposite ends. However, it should be recognized and as will become more evident hereinafter, only one of the support beams of each of the shelves 12 which is desired to be moved to accommodate changes in vertical position need have the coupling means 20. In order to insure stability of the storage rack, a plurality of cross braces or truss lacing 14 are transversely connected between the uprights 11. For purposes of illustration, a pallet 15 having a plurality of boxes 16 thereon is shown positioned on a shelf 12. Of course, if the goods to be placed on the storage shelves are equal to or greater in length than the transverse width of the storage rack, then no pallet is necessary.

In accordance with the invention, the uprights 11 comprise channels, in the illustrated instance reinforced channels generally U-shaped in construction and adapted for quick connection to and decoupling of, at any desired position longitudinally thereof, the coupling means 20 which, as previously described, mount a load support beam 13. To this end each of the channels comprises a pair of spaced legs 21 and 22 respectively projecting substantially perpendicularly to a web 23, the legs having inturned terminal portions 24a and 24b, in the present instance substantially parallel to the web 23, and spaced to receive therebetween the cross braces or truss lacing 14. (See FIG. 2.) As illustrated in FIGS. 2 and 3, the web 23 may contain a longitudinally extending V-shaped indentation 25 which has the structural purpose of strengthening the channel and at the same time acts interiorly of the channel as an abutment for the terminal end of the cross braces 14. As may readily be imagined, the cross braces may be secured to the terminal portions 24a and 24b of the legs 21 and 22 by welding or the like as at 26. As illustrated in FIG. 3 the web 23 also contains a plurality of longitudinally spaced apertures 27, in the present instance two laterally spaced sets designated 27a and 27b.

In order to permit quick coupling and decoupling of one end of a support beam to an upright 11, the coupling means 20 comprises an angle member 30 having, in the present instance, a pair of mutually perpendicular legs 31 and 32 which merge into a junction 33. In practice, the angle member 30 may be formed of an angle iron in which the included angle between the legs 31 and 32 is equal to the included angle between the legs 21 or 22 and the web 23 of the upright 11.

In the preferred form of the invention, and an economical way in which to construct the coupling means 20, at least a portion of one leg, in the present instance the leg 31, is laterally longer from the junction 33 (i.e., in a direction perpendicular to the junction) than the leg 22 or 21 of the upright 11. Thus as illustrated in FIG. 2, the leg 31 of the angle member 30 projects beyond the inturned terminal portion 24b associated with the leg 22 of the upright 11.

In order to couple the quick coupling means 20 to the upright 11 to prevent both lateral and vertical displacement of the coupling means relative thereto, and to provide load bearing support on the upright, the coupling means includes means to clamp the angle member 30 to the web and terminal portion of a leg of the upright. To this end, one of the legs, in the present instance leg 32 of the angle member 30 is provided with at least one inwardly projecting pin 34, in the present instance a pair of longitudinally spaced pins designated 34a and 34b, the longitudinal spacing between the pins corresponding to multiples of the longitudinal spacing between the apertures 27 so that the pins 34 will register with the apertures. In the present instance, and as illustrated in FIGS. 2 and 3, the pins are adapted to register with the apertures of the set 27b.

In order to permit easy alignment and registry of the pins 34 with the apertures 27, the pins may include a bullet shaped portion 35 having a cylindrical base 36 so that upon full registry of the leg fitted with the pins, the edges of the apertures 27 are in vertical or longitudinal alignment with the cylindrical base 36. Of course other pin designs may be used but the design illustrated in FIGS. 2 and 6, has been found particularly desirable because of its self-aligning features.

In order to prevent displacement of the angle member 30 in a direction perpendicular to the post or upright 11, latch means are provided to engage with the leg of the upright. To this end, the latch means 37 comprises a member 38 having a portion 38a supported by hangers 39 on the exterior portion of the leg 31 of the angle member 30, and an angulated portion 38b registerable with a longitudinally extending slot 40 in the leg 31. As illustrated in FIG. 4, the slot 40 is dimensioned and positioned so that its trailing edge, designated 41 for purposes of identification, aligns approximately with the outer face of the terminal portion of a leg of the upright, in the present instance the terminal portion 24b of the leg 22. As shown in the drawings, the leading edge 42 of the slot 40 is positioned relative to the trailing edge 41 so that the angulated portion 38b of the member 38 closely fits the edge dimensions of the slot. As is easily recognizable, the lower portion of the slot prevents the free rotation of the member 38 in a downward direction, that is holds the angulated portion 38b of the member 38 so that it is substantially transverse to the longitudinal axis or junction 33 of the angle member 30.

In order to prevent inadvertent rotation of the member 38 in the opposite direction while providing automatic latching of the angle member 30 to the uprights 11, a biasing member 43 is positioned to overlie the slot 40 whereby rotation of the member 38, exteriorly of the leg with which it is associated, is prevented. To this end, the biasing member 43 may comprise a length of spring steel stock or the like, tack welded to the exterior of the leg as at 44, and extending laterally of the leg so as to overlie the slot 40.

In operation, it is a simple matter to move the angulated portion 38b of the member 38 upwardly and engage the exterior surface of a leg, such as the leg 22. Thereafter aligning the pins 34 with the apertures 27 permits pushing the angle member into the web until the pins 34 register with their associated apertures 27. Upon full engagement of the pins in the apertures the angulated portion 38b of the member 38 falls downwardly and embraces the terminal portion, such as the terminal portion 24b associated with the leg 22 of the upright 11.

As illustrated in FIG. 4, the load support beam may be channel shaped and preferably connected to the longer leg, in the present instance the leg 31, of the angle member 30 so as to embrace the latch means 37 thus providing a modicum of protection for the latch means. Of course, the load support beam may take the form of a box beam 53 such as illustrated in FIG. 10, which beam provides, in addition to increased strength, an enclosed housing for the latching means 37.

The coupling means illustrated in perspective in FIGS. 8 and 9 is identical to the coupling means 20 heretofore described and illustrated in FIGS. 2–7 and therefore has been numbered accordingly. However, the coupling means 20 thus illustrated is complementary to the coupling means above described, that is it may be positioned, with reference to FIG. 2, so that the leg 31 abuts the leg 21 of the upright 11 and the latching means 37 clamps the terminal portion 24a of the leg 21 instead of the terminal portion 24b of the leg 22. As is evident, the pins 34 are positioned for registry with the set of apertures 27a instead of the set of apertures 27b.

Thus the present invention provides a storage rack having quick connect coupling means which may be positioned at either end of the load support beams and which require no auxiliary tools of any sort in order to move the beams or shelves or displace them from one vertical position to another. Further, the beams or shelves are supported by the coupling means in such a manner as to prevent inadvertent displacement or dislodgement while the shelves are being loaded. In addition, the novel locking means of the quick connect coupling provides sure alignment and clamping of the load support beams to an upright or post thereby preventing inadvertent or accidental displacement of the load support beams relative to the posts.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. In a storage rack comprising a plurality of spaced uprights, each having at least a web and one leg projecting therefrom, at least one of said uprights having a plurality of longitudinally spaced apertures in the web thereof, said rack having at least one load support beam connected to a pair of said uprights, at least one coupling means connected to said beam and operable to fasten said beam to said upright having an apertured web: said coupling means comprising an angle having angularly spaced legs merging into a junction, at least one of said legs of said angle having a portion extending laterally a greater distance from said junction than said leg of said upright, said extended portion having a slot therein spaced from said junction a distance equal to the length of said leg of said upright, and latch means connected exteriorly of said one leg of said angle, said latch means having a portion fittable in said slot and of sufficient length to project interiorly of said leg and engage behind the terminus of said leg of the angle of said upright; said other leg having at least one inwardly projecting pin mounted thereon, said pin dimensioned to register with an aperture in said web for engagement therein by insertion axially of said pin, said latch cooperative upon axial insertion of said pin into said aperture and engagement of said latch behind said terminus to clamp said coupling means to said upright, and operative upon disengagement of said latch to afford axial withdrawal of said pin from said aperture to uncouple said beam from said upright, and biasing means mounted on said one leg of said angle for engagement with said latch means whereby said latch means tends to be positioned interiorly of said angle.

2. In a storage rack in accordance with claim 1 wherein said latch means comprises a member rotatably mounted on the exterior portion of said leg and an angulated portion registerable with said slot.

3. In a storage rack in accordance with claim 2 wherein said biasing means comprises a length of springy material connected to the exterior of said leg and extending so as to overlie the slot.

4. In a storage rack in accordance with claim 1 wherein said other leg includes another inwardly projecting pin longitudinally spaced from said first pin and adapted to register with another aperture in said web for engagement therein by insertion axially of the pin, the longitudinal spacing of said pins corresponding to a multiple in the spacing of said apertures in the web of said upright.

5. In a storage rack in accordance with claim 4 wherein each of said pins includes a bullet-shaped portion mounted on a cylindrical base, said base being connected to said other leg.

6. In a storage rack comprising a plurality of spaced uprights having at least a web and two legs projecting therefrom, at least one of said uprights having a plurality of longitudinally spaced apertures in the web thereof, said rack having at least one load support beam connected to a pair of said uprights, at least one coupling means connected to said beam and operable to secure said beam to said upright having an apertured web: said coupling means comprising an angle having angularly spaced legs merging into a junction, said included angle between said legs corresponding to the included angle between said web and one of its legs, at least one of said legs of said angle extending laterally a greater distance from said junction than one of said legs of said upright, said longer leg having a slot therein spaced from said junction a distance equal to the length of said one leg of said upright, and latch means connected exteriorly of said one leg of said angle, said latch means having an angularly bent portion fittable in said slot and of sufficient length to project interiorly of said leg and engage behind the terminus of said leg of said upright; said other leg of said angle having at least two longitudinally spaced pins projecting inwardly parallel to said one leg of the angle, the spacing of said pins corresponding to a multiple in the spacing of said apertures in the web of said upright and dimensioned to register therewith for engagement therein by insertion axially of said pins, said latch cooperable upon axial insertion of said pins into said apertures and engagement of said latch behind said terminus to clamp said coupling means to said upright, and operable upon disengagement of said latch to afford axial withdrawal of said pins from said apertures to uncouple said beam from said upright, and biasing means mounted on said one leg of said angle for engagement with said angularly bent portion of said latch means whereby said latch means tends to remain positioned interiorly of said angle.

7. In a storage rack in accordance with claim 6 wherein said biasing means comprises a length of springy material connected to the exterior of said leg and extending so as to overlie said slot.

8. In a storage rack in accordance with claim 6 wherein each of said pins includes a bullet-shaped portion mounted on a cylindrical base, said base being connected to said other leg of said angle.

9. In a storage rack in accordance with claim 6 wherein said load support beam is mounted on said one leg and positioned to at least partially enclose said latch means.

References Cited

UNITED STATES PATENTS

| 3,054,511 | 9/1962 | Erismann | 211—176 |
| 3,070,237 | 12/1962 | Fullerton et al. | 287—189.36 |
| 3,273,720 | 9/1966 | Seiz | 211—148 |
| 3,291,319 | 12/1966 | Novales et al. | 211—177 |

FOREIGN PATENTS 132,670  6/1949  Australia.

ROY D. FRAZIER, Primary Examiner.

W. D. LOULAN, Assistant Examiner.

UNITED STATES PATENT OFFICE
CERTIFICATE OF CORRECTION

Patent No. 3,337,062                          August 22, 1967

Edward A. Seiz

It is hereby certified that error appears in the above numbered patent requiring correction and that the said Letters Patent should read as corrected below.

Column 5, lines 4 and 5, strike out "minus of said leg of the angle of said upright; said other leg having at least one inwardly projecting pin mounted" and insert instead -- minus of said leg of said upright; said other leg of the angle having at least one inwardly projecting pin mounted --.

Signed and sealed this 27th day of August 1968.

(SEAL)
Attest:

Edward M. Fletcher, Jr.                          EDWARD J. BRENNER
Attesting Officer                                 Commissioner of Patents